L. R. BLAKE.
Hydraulic Hose.
No. 138,845. Patented May 13, 1873.
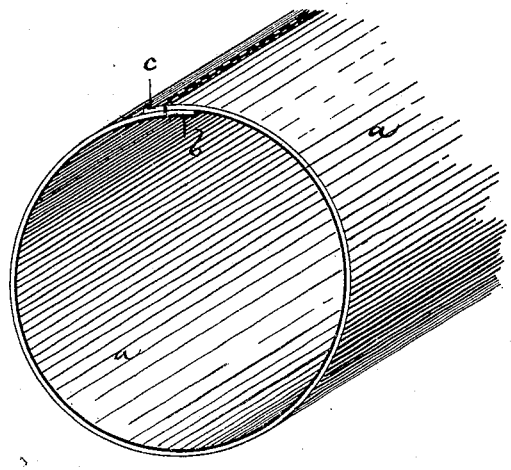
Witnesses.
M. W. Frothingham.
L. H. Latimer.
Inventor.
Lyman R. Blake.
By his Attys.
Crosby & Gould

UNITED STATES PATENT OFFICE.

LYMAN R. BLAKE, OF BROOKLYN, NEW YORK.

IMPROVEMENT IN HYDRAULIC HOSE.

Specification forming part of Letters Patent No. 138,845, dated May 13, 1873; application filed September 25, 1872.

*To all whom it may concern:*

Be it known that I, LYMAN R. BLAKE, of Brooklyn, in the county of Kings and State of New York, have invented an Improved Hydraulic Hose; and I do hereby declare that the following, taken in connection with the drawing which accompanies and forms part of this specification, is a description of my invention sufficient to enable those skilled in the art to practice it.

United States Letters Patent Nos. 31,214 and 74,289 relate to improved methods of making hydraulic hose, in which methods the edges of the strip are lapped, and the lapped edges are united by a row or by rows of stitches passing through the edges from inside to outside, or vice versa. The patent No. 74,289 was granted to me, and in my experiments I have produced upon my machine a hose made of a strip of canvas or duck, the edges of the strip being brought together, and lapped and united by a row or rows of stitches. Such hose made of close-woven material is impervious to water, withstands a great pressure, and can be produced at a very moderate cost compared to the cost of a woven seamless hose or a hose woven as a tube.

My invention consists in hydraulic hose as a new article of manufacture, made of a strip of woven material bent into tubular form, and having its edges united by one or more rows of continuous stitches.

In making the hose I prefer to coat the inner surface with a water-proof cement or composition, as such coating tends to protect the woven material; and one part of my invention consists in hydraulic hose made of woven material, and having its inner surface coated with rubber or rubber compound.

The drawing represents a piece of hose embodying my invention.

*a* denotes the strip from which the hose is to be made. *b* and *c* are the two opposite edges thereof. These edges are brought together by a suitable guiding mechanism that laps one edge over the other. The edges being thus lapped, the work is properly guided to the feed and stitch-forming mechanism of a sewing-machine similar to that shown in my patent No. 74,289, and by such mechanism the edges are firmly united. The cement is preferably applied to the strip from which the hose is to be made rather than to the inner surface of the tube after the hose is formed. When seamless hose is woven it is impossible to exert much strain upon the filling-threads, and consequently the texture is loose and pervious; but in my invention the best and most closely-woven canvas can be used.

I claim—

A hose formed of a strip of woven material, the edges of which are lapped and united by stitches passing from the outside to the inside, or vice versa, substantially as shown and described.

LYMAN R. BLAKE.

Witnesses:
FRANCIS GOULD,
M. W. FROTHINGHAM.